United States Patent [19]
Mitchell

[11] 4,189,376
[45] Feb. 19, 1980

[54] SOLVENT EXTRACTION PROCESS
[75] Inventor: David S. Mitchell, San Rafael, Calif.
[73] Assignee: Chevron Research Company, San Francisco, Calif.
[21] Appl. No.: 909,890
[22] Filed: May 26, 1978

Related U.S. Application Data
[63] Continuation-in-part of Ser. No. 833,330, Sep. 14, 1977, abandoned.
[51] Int. Cl.² ............................ C10G 1/04; B01D 11/02
[52] U.S. Cl. ............................ 208/11 LE; 208/8 LE; 260/705; 423/658.5
[58] Field of Search ..................... 208/8 LE, 11 LE; 260/705; 423/658.5

[56] References Cited
U.S. PATENT DOCUMENTS

| | | | |
|---|---|---|---|
| 2,965,557 | 12/1960 | Price | 208/11 LE |
| 3,475,318 | 10/1969 | Gable et al. | 208/11 LE |
| 3,875,046 | 4/1975 | Rosenbloom | 208/11 LE |

Primary Examiner—Herbert Levine
Attorney, Agent, or Firm—D. A. Newell; R. H. Davies; W. D. Reese

[57] ABSTRACT

A method is disclosed for solvent-extracting an extractable component from a mixture including the extractable component and subdivided solids, comprising: (a) maintaining a vertically extending bed comprising the solids in an extraction zone and introducing the mixture into an upper portion of the bed; (b) introducing a vaporizable liquid solvent into the upper portion of the bed; (c) providing a substantially continuous gaseous phase in contact with a lower portion of the bed; (d) maintaining a substantially continuous liquid phase comprising the solvent in contact with the upper portion of the bed above the gaseous phase, the liquid phase and gaseous phase having an interface at a vertically intermediate level, extracting the extractable component from the mixture by passing the solvent through the upper portion of the bed, and removing a liquid stream including the solvent and the extractable component from the extraction zone; (e) preventing the liquid phase from flowing downwardly through the lower portion of the bed by maintaining the gaseous phase at a pressure sufficient to support the liquid phase thereon, and vaporizing liquid adhering to solids in the lower portion of the bed; and (f) removing the solids from the lower portion of the bed.

12 Claims, 2 Drawing Figures

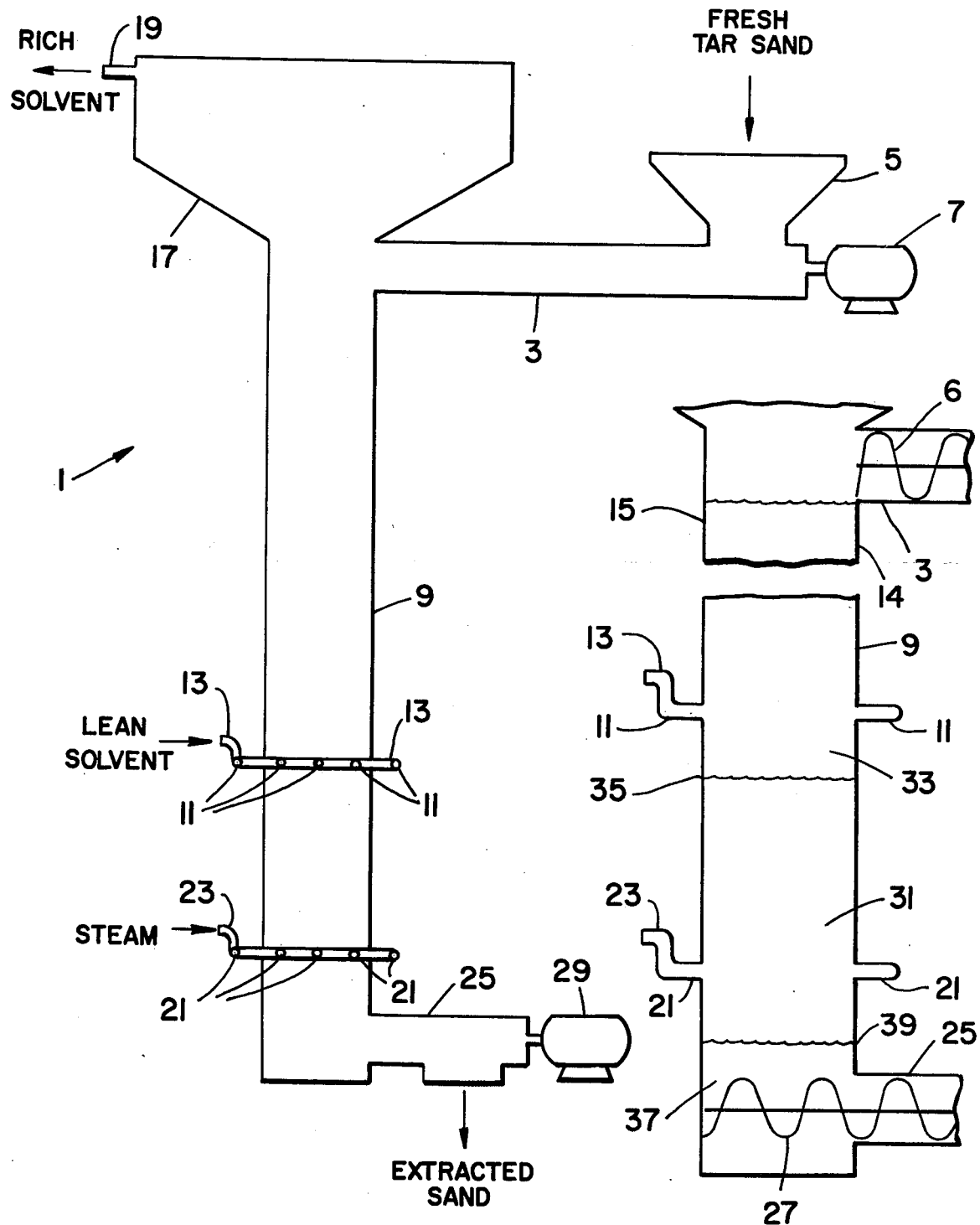

SOLVENT EXTRACTION PROCESS

CROSS-REFERENCE TO RELATED APPLICATION

This application is a continuation-in-part of my copending application Ser. No. 833,330, filed Sept. 14, 1977 now abandoned, the teachings of which are incorporated herein by specific reference.

BACKGROUND OF THE INVENTION

The present invention relates to a process for solvent extraction of solvent-extractable materials from a mixture including subdivided solids.

A variety of solvent-extractable materials are recovered from admixture with subdivided solids by solvent-extraction processes. For example, hydrocarbons and hydrocarbonaceous oils may be recovered from association with hydrocarbon-containing solids such as tar sands, oil shale and the like, and can be used as a substitute or supplement for petroleum and petroleum derivatives. One key factor in solvent extraction of large amounts of hydrocarbons from solids is the economical recovery of solvent from the residual solids.

One tar sand solvent-extraction process previously proposed involves mixing a solvent with the tar and then draining off the solvent and extracted hydrocarbons (bitumen). After being drained off, bitumen and solvent are then separated by fractionation. The bitumen is normally subjected to further conventional refining. After the bitumen and solvent have been drained from the solids, the solids are treated to remove any adhering solvent by steam stripping. Each extraction and drain stage can include countercurrent washing of the solids with solvent.

In U.S. Pat. No. 3,475,318, it is proposed to solvent-extract tar from tar sands using aliphatic hydrocarbons having 5 to 9 carbon atoms or mixtures of such aliphatics with up to 20% of aromatics having 6 to 9 carbon atoms. The tar sand is broken down into particles of a size between 0.03 and 0.25 inch diameter before solvent extraction. Solvent is passed over a bed of tar sand formed on a filter. The solid and tar are separated from the solvent residue by filtration. After filtration, the solids are stripped of volatiles with steam, which is employed at a rate of 3-21 pounds per 100 pounds of sand for a time of 0.5 to 3 minutes. Solvent is recovered by decantation from the subsequently condensed steam.

In U.S. Pat. Nos. 3,573,195 and 3,573,196 it is proposed to extract bitumen from bituminous sand by mixing the sand with water and hydrocarbon diluent containing dissolved normally gaseous ($C_1$-$C_3$) hydrocarbons, at a temperature of less than 110° F. and then introducing the resulting mixture into a body of water maintained at a temperature above 150° F. The normally gaseous hydrocarbons come out of solution and float the bitumen to the surface of the water for recovery. The hydrocarbon diluent is recovered by decantation from the water.

U.S. Pat. No. 3,875,046 discloses a solvent-extraction process using a single vertically extending extraction vessel. Downwardly flowing particulate tar sand is fluidized by an upwardly flowing liquid mixture of water and hydrocarbon solvent. The hydrocarbon solvent is selected to boil at a temperature below the boiling point of water. Steam is introduced into an intermediate level of the vessel to scour the solvent from the residual sand. Solvent is introduced above the steam introduction point, and water is introduced below the steam introduction point. Solvent condenses on the cooler sand higher up in the bed. The tar and hydrocarbon solvent are separated from water above the top of the tar sand bed by decantation and the solvent phase and water phase are removed. The water introduced into the lower end of the bed contains agglomerated fines. The wet, stripped sand is removed from the bottom of the vessel. The amount of hydrocarbon solvent employed is preferably that sufficient to control the viscosity of the tar recovered. The problem of solvent recovery is discussed. That is, this patent recognizes that a practical process for solvent extraction of hydrocarbon-containing solids necessarily must include some more-or-less effective means for recovering the organic solvent from the residual solids before the solids are discarded. The more solvent that is lost with the solid residues, the less economical will be a given solvent-extraction process.

The extraction of hydrocarbonaceous materials from coal and oil shale is known in the art. For example, U.S. Bureau of Mines Bulletin No. 635, entitled "Development of the Bureau of Mines Gas-Combustion Oil-Shale Retorting Process", by Arthur Matzick et al, refers on page 10 to the benzene-soluble material in oil shale, and refers on page 12 to the partial solubility of the organic material of oil shale in organic solvents. A textbook entitled "Chemistry of Coal Utilization", edited by H. H. Lowry, published by John Wiley & Sons, Inc., states on page 237, "Extraction of coal by solvents has been for many years a method used for studying the constitution of coal and for producing products of potential industrial value". Pages 239-240 refer to the extraction of low rank coal with primary aliphatic amines, and coal extraction with benzene, pyridine, phenols, aromatic hydrocarbons, aliphatic hydrocarbons, alcohols, ketones, etc. Page 243 states that ethylenediamine extracts material from coal at room temperature. The teachings of the two last-mentioned publications are incorporated herein by specific reference.

SUMMARY OF THE INVENTION

In a broad embodiment, the invention relates to a method for solvent-extracting an extractable component from a mixture including the extractable component and subdivided solids, comprising the steps of: (a) maintaining a vertically extending bed comprising the solids in a vertically extending extraction zone and introducing the mixture into an upper portion of the bed; (b) introducing into the upper portion of the bed a vaporizable liquid solvent capable of extracting at least a portion of the extractable component from the mixture; (c) providing a substantially continuous gaseous phase in contact with a lower portion of the bed; (d) maintaining a substantially continuous liquid phase comprising the solvent in contact with at least a lower part of the upper portion of the bed above the gaseous phase, the liquid phase and the gaseous phase having an interface at a vertically intermediate level of the bed, extracting the extractable component from the mixture by passing the solvent through the upper portion of the bed, and removing from the zone a liquid including the solvent and the extractable component; (e) preventing the liquid phase from flowing downwardly through the lower portion of the bed by maintaining the gaseous phase at a pressure sufficient to support the liquid phase thereon and vaporizing solvent adhering to solids in the lower portion of the bed; and (f) removing from the zone solids in the lower portion of the bed.

In a more specific embodiment, a method is disclosed for solvent-extracting an extractable hydrocarbonaceous component from tar sand, comprising: (a) maintaining a vertically extending packed bed of tar sand in a vertically extending vessel; (b) introducing a vaporizable liquid solvent comprising at least one hydrocarbon having a boiling point above 50° F. and below 525° F. into an upper portion of the bed; (c) providing a substantially continuous gaseous phase in contact with a lower portion of the bed by introducing steam into the lower portion of the bed; (d) maintaining a substantially continuous liquid phase comprising the solvent in contact with the upper portion of the bed above the gaseous phase, the liquid phase and the gaseous phase having an interface at a vertically intermediate level of the bed, extracting the extractable hydrocarbonaceous component from the mixture by passing the solvent through the upper portion of the bed, and removing a liquid including the solvent and the extractable hydrocarbonaceous component from the vessel; (e) preventing the liquid phase from flowing downwardly through the lower portion of the bed by maintaining the gaseous phase at a pressure sufficient to support the liquid phase thereon, and stripping off solvent adhering to solids in the lower portion of the bed with the steam; and (f) removing the solids from the vessel from the lower portion of the bed.

I have found that solvent-extractable components can be efficiently extracted from admixture or association with insoluble subdivided solids in such materials as tar sand in a single vessel with extremely small solvent losses. By (1) heating a lower portion of a bed of solids to strip solvent from the solids, and (2) maintaining a substantially continuous gaseous atmosphere in contact with the solids in the lower portion of the bed, a substantially continuous liquid solvent phase can be maintained above the gaseous phase, supported on the gaseous phase. Liquid solvent entering the gaseous phase adhering to solids is stripped off the solids. Vaporized solvent returns to the liquid phase higher in the vessel and condenses. The bed of solids is either continuously moved downward or alternately held static and moved downward.

Conveniently, the solvent can be stripped off solids in the lower portion of the moving bed and a substantially continuous gaseous atmosphere can be maintained at the desired pressure by introducing steam into the lower portion of the bed. In one preferred embodiment using steam as a stripping and gaseous-phase-forming medium, the solvent is preferably selected to have a boiling point below that of water at the pressure used.

Further objects, embodiments and advantages of the present invention will be apparent from the following description of the drawings and detailed description of the invention.

THE DRAWINGS

In the attached drawings, FIG. 1 shows a side view of a solvent-extraction system employing a preferred embodiment of the present invention, and FIG. 2 shows a side sectional view of a part of the system shown in FIG. 1.

Referring to FIG. 1, there is shown a vertically extending solvent extraction zone such as a vessel or column 1, into an upper portion of which is fed an intimately associated mixture of an extractable material and subdivided solids, e.g., tar sand, by a conduit 3, connected to a supply hopper 5. The tar-solids mixture is conveyed from the hopper 5 into the vessel 1 by a screw-feed mechanism 6 (see FIG. 2) located within the conduit 3 and driven by a motor 7. The feed mechanism may be operated continuously or intermittently. A vaporizable liquid solvent such as hexane is introduced into a vertically elongated portion 9 of the column 1 through a plurality of radially spaced inlets 11, each of which is connected to a feed manifold 13, which leads to a supply of solvent (not shown). The upper end of a bed 14 comprising subdivided feed solids is maintained below the level of the conduit 3 and above the level of the solvent inlets 11, the upper end of the bed 14 being indicated in FIG. 2 by a line at 15. The vessel 1 includes a larger-diameter clarifying section 17 at its top end, to allow liquid containing both solvent and extracted materials to be decanted, for separation from entrained fine solids, before the liquid is removed from the top of the clarifying section through an outlet 19. Steam is introduced into the column 1 through a plurality of radially spaced inlets 21, each of which is connected to a steam feed manifold 23. Stripped residual solids are removed from the bottom of the column 1 through a conduit 25. The residual solids are conveyed from the column by a screw conveyor 27 (see FIG. 2) which is driven by a motor 29. The conveyor 27 may be operated continuously or intermittently.

Referring to FIG. 2, a substantially continuous gaseous phase designated generally by the number 31 is maintained in contact with a lower portion of the bed 14 below the solvent inlet 11. A substantially continuous liquid phase, designated generally by the number 33, is maintained in contact with an upper portion of the bed 14 above the gaseous phase 31 with the liquid phase being supported on the gaseous phase. A liquid-gas interface between the liquid phase 33 and the gaseous phase 31 at an intermediate level of the solids bed is indicated by a line at 35. A liquid-water phase, designated generally by the number 37, may be formed in some cases below the gaseous phase by condensation of steam from the gaseous phase 31. A liquid-gas interface, which may thereby be formed between the water phase 37 and the gaseous atmosphere 31, is indicated in FIG. 2 by a line at 39.

DETAILED DESCRIPTION OF THE INVENTION

In general, the present solvent-extraction method is useful for recovering solvent-extractable components associated with subdivided, substantially non-extractable solids. The solubility, in any solvent, of any particular extractable component which it is desired to separate from intimate association with subdivided solids will, of course, depend on the particular solvent, or mixture of solvents, used. In operation of the present method it is required that the solvent be vaporizable and capable of extracting at least a portion, e.g., at least one weight percent, of the extractable component from a mixture including the extractable component and the subdivided solids. Taking these restrictions into account, it will be within the ability of those skilled in the art to select an appropriate solvent or solvent mixture for extracting a particular extractable component to separate it from association with non-extractable subdivided solids. When a material to be subjected to extraction is not found in a desired size range, the desired size range may be obtained, if necessary, by conventional grinding, milling, crushing or like procedure. Conventionally, solvent extraction typically involves recovering a solvent-extractable organic component from initimate association with insoluble organic or inorganic subdivided solids. An organic solvent is often employed. The choice of solvent is normally made to optimize recovery of the particular desired extractable organic component.

Examples of mixtures of a solvent-extractable component intimately associated with subdivided solids are seeds such as cottonseed, soybeans, flax seed, etc., in which the cottonseed oil, soy oil and linseed oil are the extractable components, with the subdivided solids being composed primarily of organic cellulosic material.

According to a preferred embodiment, the present method is particularly adapted for use i solvent extracting extractable hydrocarbonaceous components, e.g., bitumen, referred to generally herein as "hydrocarbons", from tar sands (bituminous sands), oil shale, coal, lignite, and the like, which contain a mixture of extractable hydrocarbonaceous components and subdivided, insoluble, inorganic solids. The present method is particularly adapted for use in extracting extractable liquid or liquefiable hydrocarbonaceous materials, normally termed "tar" or "bitumen", from the naturally occurring mixtures of tar, or bitumen, and inorganic sand known as tar sands or bituminous sands. Deposits of such hydrocarbonaceous sands are found at several locations in th United States and Canada. The extractable component in tar sand, as will be readily appreciated by those skilled in the art, often includes oxygenated, nitrogenated, and other hetero-type organic compounds in addition to compounds which can be strictly classified as hydrocarbons.

The method of the invention may most conveniently be carried out in any type of vertically extending confined space, such as an extraction zone or vessel formed by a vertical pipe, conduit, chamber, etc. Generally, any type of conduit or chamber is suitable, providing that it is adapted to hold a vertically extending bed of the material to be solvent extracted and is adapted to contain the liquid solvent and a heated gaseous atmosphere at temperatures and pressures employed. A variety of conduits, chambers, reactors and the like which are suitable for use to provide an extraction zone or vessel employed in the present extraction method will be readily apparent to those skilled in the art.

In carrying out the method of the invention, a mixture of non-extractable subdivided solids and a solvent-extractable component in intimate association is passed into the upper portion of the extraction zone, and a bed comprising the non-extractable solis is maintained in the extraction zone. Preferably the solids are maintained in the extraction zone as a packed bed. Thus, solids higher up in the bed are preferably at least partially supported by solids lower in the bed, rather than solids being ebullated or fluidized by liquid or gaseous materials in the extraction zone. In one mode of operation, the bed is preferably maintained with particles substantially continuously moving downwardly through the extraction zone. In this mode, the particles preferably move downwardly in substantially plug flow. It will be appreciated that in a bed with a relatively large horizontal cross-sectional area, different portions of the bed may be moving downwardly at somewhat different rates, even when a packed bed is used. Materials to be solvent extracted may be introduced into the bed and residual solids may be removed from the bed, continuously or periodically or at any convenient time, in any convenient manner, e.g., by a screw conveyor, star feeder, rotating grate, etc. Preferably, when residual solids are removed from the bed, they are removed relatively uniformly from a complete cross-section of the bed, so that plug-type flow of solids downwardly through the vertical extraction zone is facilitated. Plug-type solids flow using a packed bed of solids is particularly advantageous in the present method, in that fewer fine solids are entrained in the moving liquid solvent and extracted material. It will be understood that, while the bed comprises primarily the non-extractable solids, the bed may also include unextracted fractions of the extractable component. This is particularly so closer to the upper end of the bed, and in cases where the extractable component is solid or semisolid prior to extraction.

In another mode of operation, the bed is preferably alternately moved downwardly and held substantially static. The length of time the bed is held static and the length of time the bed moves downward in the alternating moving-static mode can be varied to permit optimum extraction of the extractable component in the liquid phase and to permit optimum removal of solvent liquids from the residual solids in the gas phase. Preferably, the alternating of downward movement and holding stationary can be carried out in a periodic manner, but such is not necessary. In some cases, the pressure of the gas phase is sufficient to impede or halt the downward movement of the bed. In such cases, the pressure can be alternately increased and decreased, with the bed moving downward during the lower pressure periods and remaining static during the higher pressure periods. In the higher-lower pressure mode, the interface between the gas phase and the liquid phase can be made to move higher in the bed during the higher pressure, stationary bed periods, and when the pressure is decreased and the bed moves downward, then the interface between the gas phase and the liquid phase also moves downward, in some cases at a faster rate than the bed. In embodiments using steam to provide the gas phase, the flow of steam can be alternately increased and decreased or alternately turned on and off, whereby the movement of the bed and the vertical level of the gas-liquid interface can be controlled.

Further in carrying out the invention, a vaporizable liquid solvent is introduced into an upper portion of the bed of solids. The exact locus or vertical level at which liquid solvent is introduced is not believed to be particularly critical, providing that it is sufficiently spaced from the bottom of the bed to provide space for formation of a gaseous phase below the solvent introduction level and to allow space sufficient for vaporization and separation of any adhering solvent from the solids below the solvent inlet, and the liquids outlet to allow effective contact between the solvent and solids in the upper portion of the bed.

The best solvent for use in any particular case can be selected by one skilled in the art according to the type of extractable component to be extracted in the given case. The solvent must be vaporizable to permit its use and should have a normal boiling point below at most 550° F., and preferably below 450° F. Representative of generally suitable solvents are: hydrocarbons, including, for example, $C_4$–$C_{10}$ or higher aliphatics such as pentanes, hexanes, heptanes, octanes, olefins and cycloolefins such as methylcyclopentene, naphthenes such as cyclopentane, cyclohexane, alkylcyclohexanes, as well as $C_6$–$C_{10}$ or higher aromatics such as benzene, toluene, xylenes, ethylbenzene, $C_4$-500° F. boiling petroleum fractions such as naphthas, gasoline fractions, etc., especially $C_4$-200° F. fractions, $C_4$-500° F. or higher-boiling synthetic hydrocarbon fractions such as may be derived from pyrolysis, gasification, liquefaction or extraction of tar sand, coal, oil shale and the like, especially $C_4$-200° F. fractions, halogen-substituted hydrocarbons such as carbon tetrachloride, chloroform, trichlorofluoromethane, ethyl chloride, ethylene dichloride, methylene chloride, perchloroethylene, trichloroethylene; alcohols such as methanol, ethanol, isopropanol, butanol, pentanol, hexanol, etc., phenol, alkylphenols; esters such as methyl acetate, ethyl acetate isopropyl acetate, butyl acetate, vinyl acetate; ketones such as acetone, methyl ethyl ketone; ethers such as tetrahydrofuran; carbon disulfide; dimethylformamide; polyols, glycol ethers, etc.

It is especially to be noted that mixtures of two or more of the solvents or classes of solvents discussed above are often suitable for use in the present method. For example, mixtures of aromatic and aliphatic hydrocarbons, or mixtures of alcohols with hydrocarbons, such as phenol-benzene mixtures, are quite suitable.

Surface-active agents, whether termed "surfactants", "wetting agents", etc., can be employed in the present method. For example, a surfactant can be mixed with the solvent to enhance the solvent properties or to enhance removal of organic liquids from pores of nonextracted solids. Suitable surface-active agents can be, for example, inorganic hydroxide salts, carboxylic acids, sulfuric esters, alkane sulfonic acids and salts, alkylaromatic sulfonic acids and salts, organic and inorganic ammonium salts, alkali metal silicates, phosphoric acids and salts, amine salts, and the like. Specific examples of suitable surface-active agents are sodium laural sulfate, polyoxyethylene alkylphenols, dodecyl trimethyl ammonium chloride, alkylaryl naphthenic sulfonate, tetrasodium pyrophosphate, sodium tripolyphosphate, potassium pyrophosphate and sodium silicate, sodium carbonate, alkali metal hydroxides, and alkaline earth metal hydroxides.

Emulsion-breaking components may also be used in the system, as by combining them with the solvent in an effective amount. Examples of suitable de-emulsifiers include polyethoxyalkylene, diethyl ethanolamine, polyols, and polyoxypropylene glycols.

Solvents which are insoluble (or immiscible) or only slightly soluble (or only slightly miscible) in water are preferred. Preferably the solvent used has a normal boiling point or normal end boiling point below the normal boiling point of water. For example, hexane and cyclohexane are very suitable as to boiling point. In one preferred embodiment, the normal boiling point or normal end boiling point of the solvent is at least 25° F. below the normal boiling point of water. Preferably the solvent employed has a specific gravity of less than 1.0.

In a preferred embodiment of the present invention for solvent extraction treatment of tar sands and the like, preferred solvents include pentanes, hexanes, benzene, cyclopentane, cyclohexane and methyl cyclopentane, and olefins and cycloolefins, and particularly mixtures of two or more of the above in any proportions. Hydrocarbon fractions having a boiling range between about 100° F. and about 200° F., such as petroleum fractions available in petroleum refineries, or hydrocarbon fractions derived from coal, tar sand oil, etc., are particularly preferred solvents. A suitable solvent may, in many cases, be provided in whole or in part from extracted hydrocarbons obtained in the present extraction operation from tar sands or the like. A suitable solvent material may, for example, be obtained by fractionation, catalytic cracking, hydrocracking and/or other conventional refining or conversion treatment of the extracted material. Such solvents may, of course, be enhanced by the addition of other solvent-type materials such as phenol.

The invention can best be further described by reference to the drawings, which depict a system for carrying out a preferred embodiment of the invention. It will be understood, however, that the scope of the invention is not limited to the embodiment shown, and that the invention includes the alternatives, modifications and equivalents of the depicted embodiment which are apparent to those skilled in the art from the present description and are within the scope of the appended claims.

Referring to FIG. 1, fresh tar sand is introduced, either continuously or at regular or varying intervals, into the solvent extraction zone in the vessel 1 into the confined space provided by the vertically elongated section 9, by way of the conduit 3. Expended, residual sand is removed from the bottom of the section 9 through the conduit 25 either continuously or at intervals corresponding generally with the introduction of fresh tar sand. A bed of solid tar sand is maintained in the vessel 1, with the top end of the bed preferably kept at a level at about 15, sufficient fresh sand being supplied from the conduit 3 to compensate for the amount of residual sand removed by the conduit 25.

The tar sand is preferably introduced into the extraction system as particulate solids having a maximum average particle diameter of less than one-fourth inch. Of course, larger clumps of some tar sands will rapidly break down into particles of the desired small size when they contact the solvent, so that prior comminution is often not necessary. Preferably the tar sand is introduced with a particle size range of between 20 and 100 mesh (Tyler Sieve Series), and particularly preferably the tar sand is introduced with a particle size range of about 50–60 mesh. The bed either continuously moves downwardly in elongated portion 9 of the column or alternately moves and remains stationary. Preferably the bed is a lightly packed bed (i.e., a loosely packed bed), in which solids, when they move downwardly, do so in substantially plug flow at a rate of about 0.01 to about 1.0 foot per minute.

A lean vaporizable solvent, boiling between 100° F. and 200° F., such as organic liquids derived from processing of bitumen by hydrocracking in a conventional manner is introduced, preferably as a liquid, into the bed at an intermediate vertical level through the inlet 11. Somewhat below the solvent inlet, the lower portion of the bed is heated above the boiling point of the solvent and a substantially continuous gaseous phase is maintained in contact with a lower portion of the bed. That is, the gaseous phase substantially completely fills the interstitial spaces in the gaseous-phase region of the lower portion of the bed and is in contact with substantially all the solids in the gaseous-phase region of the lower portion of the bed. The solids in the lower portion of the bed can be heated by direct or indirect contact with a heating medium, and the substantially continuous gaseous atmosphere can be supplied by any suitable gas, such as nitrogen or steam. The gaseous phase preferably extends entirely across a horizontal cross-section of the extraction zone. That is, there is at least one complete horizontal cross-section in the lower portion of the extraction zone through which substantially no liquid solvent passes downwardly, with the interstices between solids in the bed being substantially completely gaseous. Preferably both the bed-heating requirement and provision of a gaseous phase in the extraction zone are accomplished by introducing steam into the extraction zone below the solvent inlet by way of the steam inlets 21. The steam is introduced at a temperature, rate and pressure sufficient to maintain a substantially continuous gaseous phase in contact with the lower portion of the bed and to support upon the gaseous phase a substantially continuous liquid phase comprising the solvent, which is in contact with the upper portion of the bed above the gaseous phase. Steam is provided at a temperature and pressure sufficient to maintain a liquid-gas interface, e.g., as depicted in the drawing by a line at 35. Above the interface at 35, a substantially continuous liquid phase is in contact with the bed, whereas below the interface at 35 a gaseous phase, comprising steam but generally including some solvent vapor, is in contact with the bed. The interstices of the solids in at least a lower part of the upper portion of the bed are substantially filled with liquid, so that the liquid phase is substantially continuous in the portion of the extraction zone holding any of the upper portion of the bed which is in contact with the solvent-containing liquid phase. Any liquid solvent which wets or is absorbed by the solids in the bed, when they pass below the interface at 35, is vaporized rapidly. Solvent vapor in the gaseous phase is preferably returned upwardly to the liquid phase, giving off the latent heat to solids entering the gaseous phase and condensing back into the liquid phase. The amount of steam introduced need only be enough to heat the solids in the lower portion of the bed enough to vaporize solvent adhering to the solids and to support the liquid phase above the interface. The steam introduced may all condense to liquid water by the time it is removed from the system, forming a liquid-water phase as depicted by a line at 39 in FIG. 2. The water phase which is present below the interface 39 may be kept substantially free from solvent, since the water phase is preferably maintained at a temperature above the boiling point of the solvent, while the solvent may be prevented from entering the water phase if it is substantially immiscible with the water. In cases where a solvent is used which is soluble or partly soluble in water, the water phase may contain a substantial amount of solvent. Usually, the amount of liquid water formed by condensation of steam below the gaseous phase is not enough to completely fill the void spaces between the solids in the bed. Accordingly, the portion of the bed below, e.g., the level at 39, may be partially in contact with liquid water and partially in contact with steam. In this case, a mixture of steam and liquid water is withdrawn along with the residual solids. Any solvent vapor mixed with this steam can then be recovered by condensing all the steam and solvent and separating the solvent from the condensate by decantation. Alternatively, the amount of heat introduced may be sufficient that substantially no water condenses in contact with the lower portion of the bed, and any water removed from the bed with the residual solids is in the form of steam. In this case, some solvent vapor is usually mixed with the steam and residual solids. The steam and solvent vapor may be condensed and any solvent can then be separated from the condensate by decantation.

In any case, it will be appreciated that a liquid, substantially continuous water-rich phase region may, in some cases, be present in contact with a bottom part of the lower portion of the bed below the gaseous phase region. Preferably, however, the gaseous phase is in contact with substantially all the solids in the lower portion of the bed, i.e., below the liquid, solvent-rich phase.

The extractable tar or bitumen is extracted from tar sand in the upper portion of the bed in contact with the liquid phase above the interface at 35 by passing the liquid hexane solvent upwardly through the upper portion of the bed. The solvent is preferably introduced into the column at a rate low enough that the solids in the upper portion of the bed above the solvent inlets 11, which are in contact with the liquid solvent phase, are not substantially fluidized. In this way, the bed itself acts as a filter for solid fines.

In cases where the solids to be treated may be lighter than the solvent use, as in extraction of oils from light cellulosic material, the top of the bed of solids can conveniently be maintained above the top of the liquid solvent phase in the extraction zone. In this way, a portion of the bed can be maintained submerged in the solvent phase by the pressure of solvent free solids from above. Thus, it is not critical that the solvent phase extend above the top of the bed of solids. In embodiments in which tar sand or other solids heavier than the solvent are to be extracted, the top of the liquid solvent phase preferably extends above the top of the bed of solids. This permits easy clarification of the liquid phase to remove solids from it before withdrawing it from the extraction zone. Thus, in the embodiment shown in the drawing, after the solvent passes upwardly above the top of the solids bed at 15, the resulting liquid mixture of extracted tar and hexane solvent can be clarified, if desired, in the enlarged settling section 17 of the column 1. The liquid is removed from the column from an upper portion of the liquid phase through the conduit 19. The solvent may then be separated from the tar in a conventional manner and recycled, if desired, and the tar may be further processed or refined, if desired, as by hydrocracking, fluid catalytic cracking or other known processes. The temperatures and pressures used in the present extraction method are not critical, except that the upper, liquid phase and the lower, gaseous phase must be maintained. The solvent and the mixture to be treated may be at ambient temperature and pressure prior to their introduction into the extraction vessel.

The extracted, residual solids, having passed downwardly through the extraction zone, into the gaseous phase, are then removed from the bottom portion of the solids bed. Preferably the solids are removed from a complete cross-section of the bed at a relatively uniform rate, so that plug-type downward flow of the bed downward through the extraction zone is maintained during solids removal.

The following example illustrates another preferred embodiment of the invention.

EXAMPLE I

Tests were conducted in a 2.75-inch inside diameter by 5-foot high cylindrical glass vessel. The vessel included a solvent-tar liquid outlet close to the top end, a solvent liquid inlet 28 inches below the outlet, four steam inlets on opposite sides of the vessel 16 inches below the solvent inlet and four more steam inlets on opposite sides of the vessel 5 inches below the first four steam inlets. A star feeder was disposed with its top end 4 inches below the lower two steam inlets to provide for continuous removal of sand from the bottom of the vessel at a controlled rate. Tar sand was fed either by hand or by mechanical means to the top of the vessel. Residual solids were removed from the bottom using the star feeder. Because of the difficulty of hand feeding, the tar sand level varied somewhat during hand-fed operations and often was little more than 6-12 inches. It is believed that improved extraction efficiencies could be obtained if a deeper bed were used. In previous, initial experiments, without a star feeder for removing residual solids from the bottom of the bed, difficulty had been experienced in getting the bed to move downwardly. In those initial experiments, an auger removing sand from a side port was used, rather than the star feeder. The previous tests were felt to be somewhat unsuccessful because solids were not removed from the whole cross-section of the column, and the sticky tar sands were thus allowed to bridge within the vertically extending bed. It is felt that this type of bridging would not be a problem in larger-diameter extraction vessels, in which the surface/volume ratio and hence wall friction/weight ratio would be much less. The introduction of a star feeder into the system was successful in steadily removing sands from the bottom of the bed and in allowing the whole lightly packed bed to move downwardly to about 1 to 2 inches per minute in plug-type flow.

The results from four 5-minute test periods are shown in Table I. Tar sand containing about 9 weight percent extractable oil (tar), obtained from a source near Santa Cruz, California (Milar tar sand), was introduced into the top of the vessel at a rate that varied between 100 and 160 grams per minute. Hexane solvent was introduced at the rate of 120 grams per minute. Steam was introduced into the eight inlets at a temperature of about 212° F. and at a pressure of 3 psig. The residual solids which exited the bottom of the vessel were washed several times with hexane to remove water and unextracted oil, and were then dried and weighed. The amount of unextracted oil was determined. The total weight of sand recovered for each 5-minute run is shown in Table I. Water was separated from the liquid recovered from the upper end of the vessel by decantation, and hexane was evaporated from the extracted oil. The oil and water contained in the liquid removed from the vessel were weighed, and the amounts of each of these recovered for each test period are shown in Table I. The weight percent of oil extracted was determined on the basis of 9 weight percent extractable oil in the fresh tar sand, and the amount of unextracted oil remaining in the residual solids after removal of the residual solids from the extraction system. The weight percent oil extracted is shown in Table I. During the tests, a liquid hexane-gaseous steam interface was readily discernible about 4 inches above the top steam inlets. The packed sand bed moved downwardly through the interface. The position of the interface could be varied somewhat by increasing or decreasing the rate of introduction of steam into the vessel. It was apparently desirable not to have too high a steam introduction rate, since the pressure created by the steam tended to prevent sand from flowing downwardly through the interface. The weight ratio of hexane to sand feed rates ranged from 0.75 to 1.2. Extraction efficiencies varied from about 68% to 83%. These efficiencies are believed to be substantially lower than could be obtained with a larger, or optimized, extraction vessel. The water content of the extracted sands ranged from 10 to 30 weight percent. It is believed that optimization of the extraction system could lower the water content to about 3% in an adiabatic-type system.

TABLE I
OIL EXTRACTED FROM TAR SANDS

| 5-minute time period | 1 | 2 | 3 | 4 |
|---|---|---|---|---|
| Hexane/sand rate (wt. ratio) | 1.2 | 1.2 | 0.75 | 0.75 |
| Sand weight (grams) (oil- & water-free) | 495 | 478 | 808 | 539 |
| Oill (tar) in extract (grams) | 15.5 | 9.5 | 13.5 | 13.9 |
| Water in extract (grams) | 135 | 151 | 105 | 121 |
| Wt. % oil extracted | 68 | 80 | 83 | 74 |

Table II shows data on the extracted oil and fines in the liquid recovered from the vessel. After hexane evaporation, the extracted oil samples were weighed and filtered. The weights of the samples were used to calculate the weight percent oil in the extract, as shown in Table II. The solids recovered were washed with hexane and dried and weighed. The weight percents of fines in the extracted oil were then calculated and are shown in Table II. The extracted oil ranged from about 4 to 8 weight percent of the hexane/oil extract. It is believed that this range could be increased substantially by optimization of the size and mechanical features of the extraction system. Fines in the extract were surprisingly low, less than 1%. This is believed to be at least partly because the tar sand remained in the bed as a lightly packed bed throughout the whole extraction operation. The only real opportunity for fines to escape in the experimental system was when the sands were fed to the column at the top. By adjustment of the design of the feed mechanism or by including a settling zone above the feed point, it is believed that the fines content of the extract could be substantially further reduced.

TABLE II
OIL AND FINES CONTENT OF HEXANE EXTRACT

| 5-minute time period | 1 | 2 | 3 | 4 |
|---|---|---|---|---|
| Wt. % oil in extract | 7.8 | 5.9 | 4.5 | 4.5 |
| Wt. % fines in extract | 0.86 | 0.44 | 0.43 | 0.45 |

The stripped residual tar sands, water and steam removed from the bottom of the extraction column appeared to contain extremely low levels of hexane, indicating substantially complete removal of hexane from the sand in the stripping section. The indication relied upon in determining the hexane level, however, was the lack of hexane odor emanating from the sand, water and steam. Several people tried and were unable to detect a hexane odor during the course of the runs. This somewhat subjective observation was used to place a probable upper limit on the amount of hexane in the extracted sand. One can detect the odor of hexane at a level of approximately $3 \cdot 10^{-3}$ grams per liter. Assuming that this concentration were actually present in the sands and resulted from 500 g of the material including sand, water and steam dropping into a 5-gallon can, then the hexane level on the stripped, extracted sand may be calculated to be about 0.01 weight percent. This is clearly a very low level of hexane solvent in the sand residue and indicates virtually no loss of hexane with the stripped residual sand when practicing the present extraction method.

EXAMPLE II

Tests were performed on Athabasca tar sand in the same extraction column described in Example I. The Athabasca sand contained about 10.3 weight percent bitumen. Cyclohexane was used as a solvent. A cyclohexane feed rate of 70 grams per minute and a sand feed rate of 122 grams per minute were used. The amount of bitumen extracted was found to be 85 weight percent of the bitumen content of the original sand, and the solid fines content of the bitumen extracted was found to be 0.3 weight percent.

EXAMPLE III

Tests were performed using an open-topped glass burette 3" in diameter and more than 31" in height. In each test, the burette was filled with an approximately 31"-high bed of one of various types of particulate solids. A solvent was introduced slowly through the bottom of the burette until air had been displaced above the top of the solids bed. Excess liquid was drained from the top of the liquid level through a side opening in the burette. To investigate the influence of solvent type on the maintenance of a gas-liquid interface in the extraction zone, steam was introduced into the bottom of the burette. The stability, slope and sharpness of definition of the resulting interface in the burette were then observed. Further similar tests were undertaken to investigate the influence of solids size on the maintenance of a gas-liquid interface in the extraction zone, by introducing steam into the bottom of the burette to form an interface, and the stability, slope and sharpness of the resulting interface were observed. The results of the tests are shown in Table III.

TABLE III

| | | INTERFACE FORMATION | | | |
|---|---|---|---|---|---|
| Solids (Mesh) | Solvent | Interface Stability | Slope | Sharpness | Temp. Profile |
| Tar Sand[1] | Chloroethane | Unstable | — | — | Broad |
| " | Pentane | Stable | Horizontal | Sharp | Sharp |
| " | Hexane | (Slight (Instability | (Slight (Slope | " | " |
| " | Toluene | " | " | " | " |
| " | Xylene | " | " | " | " |
| " | Kerosine | Stable | " | " | " |
| Dolomite[2] | Hexane | Unstable | — | — | Broad |
| Sand[3] | Hexane | Stable | Horizontal | Diffuse | Sharp |
| Glass Beads[4] | Hexane | " | " | Sharp | " |
| " | Chorothene | Unstable | — | " | " |
| " | Kerosine | Stable | Horizontal | " | " |
| Tar Sand[1] | Ethylene Glycol | (No Interface) | | | |
| " | Methanol | Stable | Horizontal | Diffuse | Broad |

Mesh: L6 [1]30–50
[2]8–12
[3]10–20
[4]50–100

A preferred embodiment of the present invention having been described, a large number of modifications and equivalents of the preferred embodiment will be apparent to those skilled in the art and the scope of the invention is to be determined by the appended claims.

What is claimed is:

1. A method for solvent-extracting an extractable component from a mixture including said extractable component and subdivided solids, comprising the steps of:

(a) maintaining a vertically extending continuously or intermittently downwardly moving packed bed comprising said solids in a vertically extending extraction zone and introducing said mixture into an upper portion of said bed;
   (b) introducing into said upper portion of said bed a vaporizable liquid solvent capable of extracting at least a portion of said extractable component from said mixture;
   (c) providing a substantially continuous gaseous phase in contact with a lower portion of said bed;
   (d) maintaining a substantially continuous liquid phase comprising said solvent in contact with at least a lower part of said upper portion of said bed above said gaseous phase, said liquid phase and said gaseous phase having an interface at a vertically intermediate level of said bed, extracting said extractable component from said mixture of passing said solvent through said upper portion of said bed, and removing from said zone a liquid including said solvent and said extractable component;
   (e) preventing said liquid phase from flowing downwardly through said lower portion of said bed by maintaining said gaseous phase at a pressure sufficient to support said liquid phase thereon and a temperature sufficient to vaporize solvent adhering to solids in said lower portion of said bed; and
   (f) removing from said zone solids in said lower portion of said bed.

2. A method according to claim 1 wherein said mixture is selected from tar sand and oil shale.

3. A method according to claim 2 wherein said solvent comprises at least one hydrocarbon having from 5 to 10 carbon atoms.

4. A method according to claim 1 wherein said liquid phase extends above an upper end of said bed in said extraction zone and said liquid is removed from said extraction zone above the upper end of said bed.

5. A method according to claim 1 wherein said solids in said lower portion of said bed are heated to a temperature above the boiling point of said solvent, said gaseous phase is provided by introducing steam into said lower portion of said bed, and said gaseous phase comprises steam.

6. A method according to claim 1 wherein said bed is substantially continuously moving downward in said zone.

7. A method according to claim 1 wherein said bed alternately moves downward in said zone and remains substantially stationary in said zone.

8. A method for solvent-extracting an extractable hydrocarbonaceous component from tar sand comprising:
- (a) maintaining a vertically extending continuously or intermittently downwardly moving packed bed of tar sand in a vertically extending vessel;
- (b) introducing a vaporizable liquid solvent comprising at least one hydrocarbon having a boiling point above 50° F. and below 525° F. into an upper portion of said bed;
- (c) providing a substantially continuous gaseous phase in contact with a lower portion of said bed by introducing steam into said lower portion of said bed;
- (d) maintaining a substantially continuous liquid phase comprising said solvent in contact with said upper portion of said bed above said gaseous phase, said liquid phase and said gaseous phase having an interface at a vertically intermediate level of said bed, extracting said extractable hydrocarbonaceous component from said mixture by passing said solvent through said upper portion of said bed, and removing a liquid including said solvent and said extractable hydrocarbonaceous component from said vessel;
- (e) preventing said liquid phase from flowing downwardly through said lower portion of said bed by maintaining said gaseous phase at a pressure sufficient to support said liquid phase thereon, and stripping off solvent adhering to solids in said lower portion of said bed with said steam; and
- (f) removing said solids from said vessel from said lower portion of said bed.

9. A method according to claim 8 wherein said solvent is selected from at least one hydrocarbon having 5 to 10 carbon atoms.

10. A method according to claim 8 wherein said liquid phase extends above an upper end of said bed in said extraction zone and said liquid is withdrawn from said vessel above said upper end of said bed.

11. A method according to claim 8 wherein said bed is substantially continuously moving downward in said zone.

12. A method according to claim 8 wherein said bed alternately moves downward in said zone and remains substantially stationary in said zone.

* * * * *

UNITED STATES PATENT AND TRADEMARK OFFICE
CERTIFICATE OF CORRECTION

PATENT NO. : 4,189,376
DATED : February 19, 1980
INVENTOR(S) : David S. Mitchell It is certified that error appears in the above-identified patent and that said Letters Patent are hereby corrected as shown below:

Col. 5, line 17, "i solvent" should read --in solvent--.

Col. 5, line 53, "solis" should read --solids--.

Col. 13, line 55, Table III, "Mesh: L6 $^1$30-50" should read --Mesh: $^1$30-50--.

Col. 14, line 18, Claim 1, "of passing" should read --by passing--.

*Signed and Sealed this*

*Twenty-seventh* Day of *May 1980*

[SEAL]

*Attest:*

SIDNEY A. DIAMOND

*Attesting Officer*    *Commissioner of Patents and Trademarks*